(12) United States Patent
Ohtani et al.

(10) Patent No.: US 7,753,178 B2
(45) Date of Patent: Jul. 13, 2010

(54) DISK BRAKE WITH A PARKING BRAKE FUNCTION

(75) Inventors: Yukio Ohtani, Kawasaki (JP); Yasuo Karasudani, Kai (JP); Takuya Obata, Minami-Alps (JP)

(73) Assignee: Hitachi, Ltd, Tokyo (JP)

( * ) Notice: Subject to any disclaimer, the term of this patent is extended or adjusted under 35 U.S.C. 154(b) by 787 days.

(21) Appl. No.: 11/604,847

(22) Filed: Nov. 28, 2006

(65) Prior Publication Data

US 2007/0158148 A1    Jul. 12, 2007

(30) Foreign Application Priority Data

Nov. 30, 2005   (JP)   .............................. 2005-345811

(51) Int. Cl.
*F16D 55/08*    (2006.01)

(52) U.S. Cl. ..................................... 188/72.7; 188/72.8

(58) Field of Classification Search ....... 188/72.7–72.9, 188/156–164
See application file for complete search history.

(56) References Cited

U.S. PATENT DOCUMENTS

| | | | | |
|---|---|---|---|---|
| 3,592,299 A | * | 7/1971 | Erdmann | 188/71.9 |
| 3,599,761 A | * | 8/1971 | Schultz et al. | 188/170 |
| 3,752,272 A | * | 8/1973 | Ooka | 188/345 |
| 4,804,073 A | * | 2/1989 | Taig et al. | 188/72.1 |
| 5,036,960 A | * | 8/1991 | Schenk et al. | 188/346 |
| 5,219,047 A | * | 6/1993 | Fouilleux et al. | 188/71.9 |
| 5,443,141 A | * | 8/1995 | Thiel et al. | 188/71.9 |
| 6,626,269 B2 | * | 9/2003 | Shaw et al. | 188/71.7 |
| 2008/0053760 A1 | * | 3/2008 | Oikawa et al. | 188/72.4 |
| 2009/0057073 A1 | * | 3/2009 | Ishii | 188/71.6 |

FOREIGN PATENT DOCUMENTS

WO    92/06876    4/1992

* cited by examiner

*Primary Examiner*—Christopher P Schwartz
(74) *Attorney, Agent, or Firm*—Wenderoth, Lind & Ponack, L.L.P.

(57) ABSTRACT

A disk brake with a parking brake mechanism capable of exerting a large piston thrust required for operating a parking brake, without adversely affecting operation of a service brake. A parking brake mechanism 32, which is driven by an electric motor provided outside a housing 30, is incorporated in a caliper 14 in which a piston 26 is slidably disposed in a cylinder 24. The parking brake mechanism 32 is slidably fitted via a seal member 36 into the piston 26 and provided with a nut member 37 that is prevented from rotating relative to the piston 26 by engagement of a pin 48 and a pin hole 49; and a shaft 35 that is screwed into the nut member 37. During a service brake operation, the piston 26 alone is moved by a hydraulic pressure under a small piston thrust. During a parking brake operation, the piston 26 and the nut member 37 are moved together by applying a hydraulic pressure and operating the electric motor at the same time, to exert a large piston thrust, by using a large pressure receiving area of the piston 26 and the nut member 37 combined.

15 Claims, 6 Drawing Sheets

DISK BRAKE WITH A PARKING BRAKE FUNCTION

BACKGROUND OF THE INVENTION

1. Technical Field

The present invention relates to an automotive disk brake, and in particular, to a disk brake with an electric parking brake having an electric parking brake function.

2. Prior Art

Generally, an automotive disk brake comprises: a pair of pads disposed on opposite sides of a disk; and a caliper in which a piston is slidably provided in a cylinder having a closed end, such that a hydraulic pressure, when introduced into the cylinder, thrusts the piston to cause the pair of pads to press against the disk, thereby exerting a braking force. Recently, however, disk brakes with an electric parking brake, that is, disk brakes further equipped with an electric parking brake function, have come into use. An example of a conventional disk brake having an electric parking brake is disclosed in Domestic Announcement (KOHYO) No. HEI 05-506196 of PCT application. In this example, an electric motor, which is provided outside the cylinder, functions as a driving source, such that the piston, which has been thrust by a hydraulic pressure introduced into the cylinder, is mechanically held in a braking position even after the hydraulic pressure is no longer applied.

Commonly, a disk brake with an electric parking brake is incorporated into an automatic brake system such as a vehicle dynamics control system, an antilock brake system (ABS), or a traction control system. In such a case, a hydraulic pump in the automatic brake system is used as a hydraulic pressure source for introducing a hydraulic pressure into a cylinder of the disk brakes (see Domestic Announcement No. HEI 05-506196 of PCT application). Normally, an automatic brake system of this type is provided with disk brakes with an electric parking brake at rear wheels and general-purpose disk brakes at front wheels.

However, the hydraulic pump used in the above-mentioned automatic brake system is not capable of generating a very large hydraulic pressure, which is required when a parking break is in operation, and thus is generally not suitable for use as a hydraulic pressure source for a disk brake with an electric parking brake. In a case that disk brakes with an electric parking brake are incorporated into an automatic brake system, one measure is to enlarge a diameter of piston, whereby the piston can be subject to increased thrust via a pressure receiving area of the piston.

However, to optimize a distribution of braking forces between front brakes and rear brakes in a brake system, it is common for a diameter of pistons of disk brakes with an electric parking brake disposed at rear wheels to be made smaller than that of pistons of general-purpose disk brakes disposed at front wheels. Therefore, in a case that a piston diameter is increased as described above, an optimal distribution of braking forces between the front brakes and rear brakes cannot be attained when normal, so-called service brakes are in operation, thus having an adverse effect on the entire brake system.

The present invention has been made in view of the above-described problem associated with conventional brake systems. An object of the present invention is to provide a disk brake with an electric parking brake that is capable of exerting a large piston thrust required for operating parking brakes, without adversely affecting the service brakes, so as to ensure a stable balance between the service brakes and the parking brakes.

SUMMARY OF THE INVENTION

To overcome the above-described problem, a disk brake with a parking brake mechanism according to one embodiment of the present invention comprises: a pair of pads disposed on opposite sides of a disk; a caliper in which a piston is slidably provided in a cylinder, such that a hydraulic pressure, when introduced into the cylinder, thrusts the piston to cause the pair of pads to press against the disk, thereby exerting a braking force; and a parking brake mechanism driven by an electric motor when the hydraulic pressure is introduced into the cylinder to press the pads against the disk, and adapted to mechanically hold the piston in a braking position even after the hydraulic pressure is no longer applied to the cylinder, wherein, when the electric motor is in a rotational position for parking brake release, the piston uses a first pressure receiving area to receive a hydraulic pressure applied to the cylinder and presses the pads, and when the electric motor is in a rotational position for parking brake operation, the piston uses a second pressure receiving area to receive the hydraulic pressure applied to the cylinder and presses the pads, the second pressure receiving area being larger than the first pressure receiving area.

During a service brake operation in which the electric motor is in a rotational position for parking brake release, the above-described disk brake with the parking brake mechanism uses a relatively small first pressure receiving area to receive a hydraulic pressure to impart thrust to the piston. On the other hand, during a parking brake operation in which the electric motor is in a rotational position for parking brake operation, the disk brake with the parking brake mechanism uses a relatively large second pressure receiving surface to receive a hydraulic pressure and impart thrust to the piston. In this way, the stable balance between the service brake and the parking brake is ensured.

To overcome the problem discussed above, a disk brake with a parking brake mechanism according to another embodiment of the present invention comprises: a pair of pads disposed on opposite sides of a disk; a caliper in which a cup-shaped piston is slidably provided in a cylinder having a closed end, such that a hydraulic pressure, when introduced into the cylinder by a hydraulic pressure source, thrusts the piston to cause the pair of pads to press against the disk, thereby exerting a braking force; and a parking brake mechanism driven by an electric motor that is provided outside the cylinder, and adapted to mechanically hold the piston, which has been thrust by the hydraulic pressure applied to the cylinder, in a braking position even after the hydraulic pressure is no longer applied to the cylinder, wherein the parking brake mechanism comprises: a pressing member adapted to slide in the piston according to rotation of the electric motor and to move the piston in a thrust direction; and a seal member for sealing a space between the pressing member and the piston, such that movement of the pressing member in a direction of movement of the piston is limited when the electric motor is in a rotational position for parking brake release, and a hydraulic pressure is applied to the cylinder.

Since the space between the piston and the pressing member is sealed by the sealing member, the disk brake with the parking brake mechanism can utilize a pressure receiving area equal to a cross section of the entire portion of the piston when the pressing member is driven by the electric motor to slide and then to move forward with the piston during a parking brake operation. In this way, a large piston thrust can be obtained. On the other hand, during a service brake operation, in which the electric motor is in a rotational position for parking brake release, movement of the pressing member in a direction of movement of the piston is limited. Therefore, the piston alone moves forward. In this state, the pressure receiving area is equal to the cross section of the entire portion of the piston minus the cross section of the pressing member, and as a result, a piston thrust is correspondingly reduced. In other words, despite use of a piston having an enlarged diameter to obtain a large piston thrust, which is required for a parking brake operation, a piston thrust can be reduced during a service brake operation.

According to the present invention, despite use of a piston having an enlarged diameter to obtain a large piston thrust, which is required for a parking brake operation, a piston thrust can be reduced during a service brake operation. As a result, a stable balance between the service brake and the parking brake is obtained, to thereby provide an optimized brake system.

DETAILED DESCRIPTION OF THE PREFERRED EMBODIMENT

Below, the best mode for carrying out the present invention will be described with reference to the accompanying figures.

Figure 1:
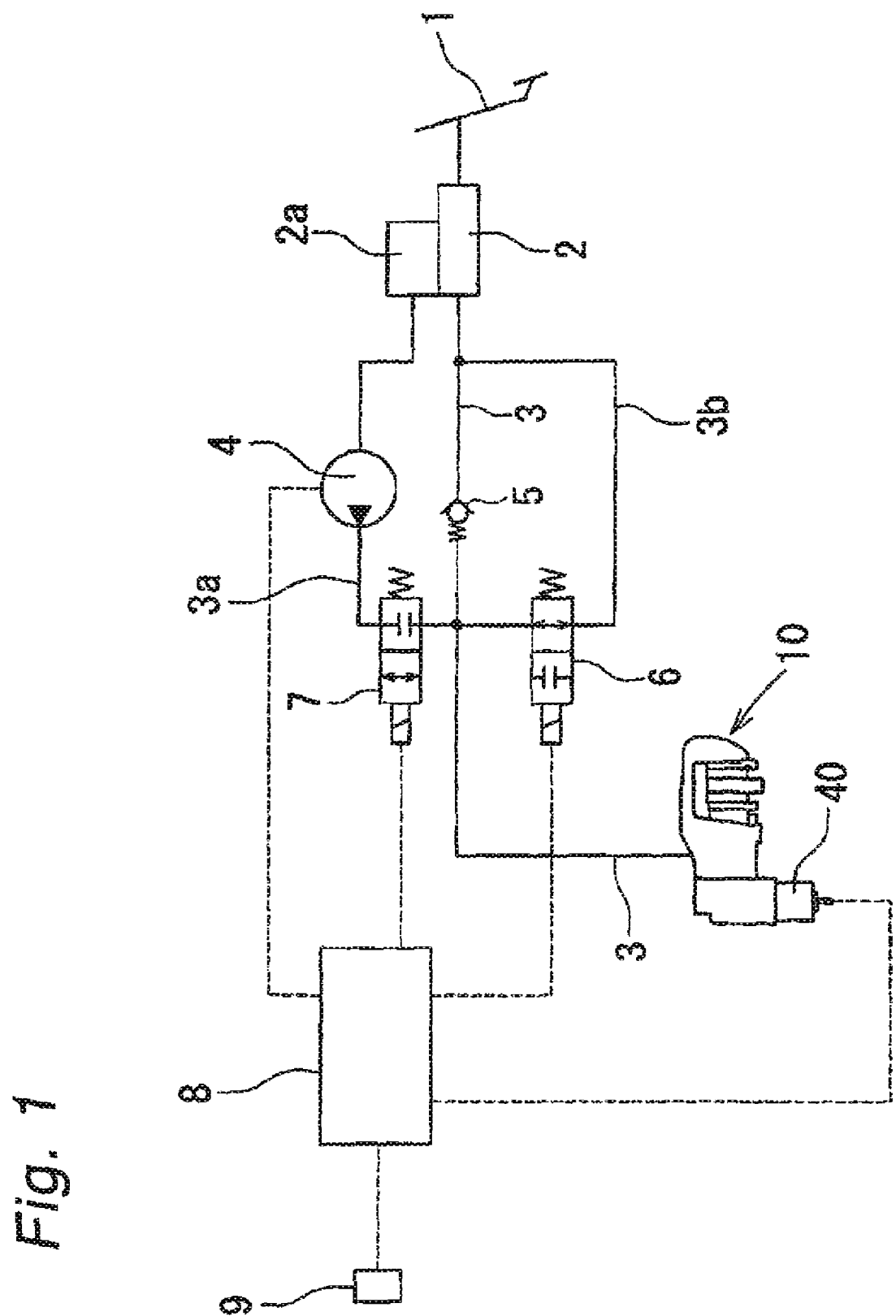
FIG. 1 is a schematic view of a brake system including a disk brake with an electric parking brake according to one embodiment of the present invention.

FIG. 1 shows a brake system including a disk brake with an electric parking brake mechanism according to the present invention. The disk brake with the electric parking brake mechanism, which is denoted by reference numeral 10 in FIG. 1, is connected via a brake fluid passage 3 to a master cylinder 2 adapted to generate a hydraulic pressure according to operation of a brake pedal 1, and is also connected to a pump 4 via a branch passage 3a that is branched off from the brake fluid passage 3 and connected to a reservoir 2a. The brake fluid passage 3 is provided at an intermediate portion thereof with a check valve 5 for preventing a counter flow toward the master cylinder 2. A branch passage 3b, which bypasses the check valve 5, is provided with an electromagnetic switching valve 6 that is normally open, while the branch passage 3a is provided on a discharge side of the pump 4 with an electromagnetic switching valve 7 that is normally closed.

The disk brake 10 with the electric parking brake mechanism contains a parking brake mechanism 32 (see FIG. 2) that is driven by an electric motor 40 provided outside the disk brake 10 with the electric parking brake mechanism. Details of the parking brake mechanism 32 will be described later. To operate the parking brake, the electromagnetic switching valve 7 in the branch passage 3a is switched whereby a predetermined hydraulic pressure is applied by the pump 4 to the disk brake 10 with the electric parking brake mechanism, and with the application of this hydraulic pressure, the electric motor 40 is activated. At the same time, the electromagnetic switching valve 6 in the branch passage 3b is closed to prevent the hydraulic pressure from the pump 4 from acting on the master cylinder 2. The electric motor 40 and the two electromagnetic switching valves 6 and 7 are controlled by a control apparatus 8, which is provided separately. The control apparatus 8 is connected to a parking brake switch 9 (such as a push button) for outputting a parking-brake command signal. It is to be noted, that although in this embodiment, the pump 4 is designed to use brake fluid in the reservoir 2a of the master cylinder 2, a separate oil tank may be provided to supply brake fluid to the pump 4 only.

Figure 2:
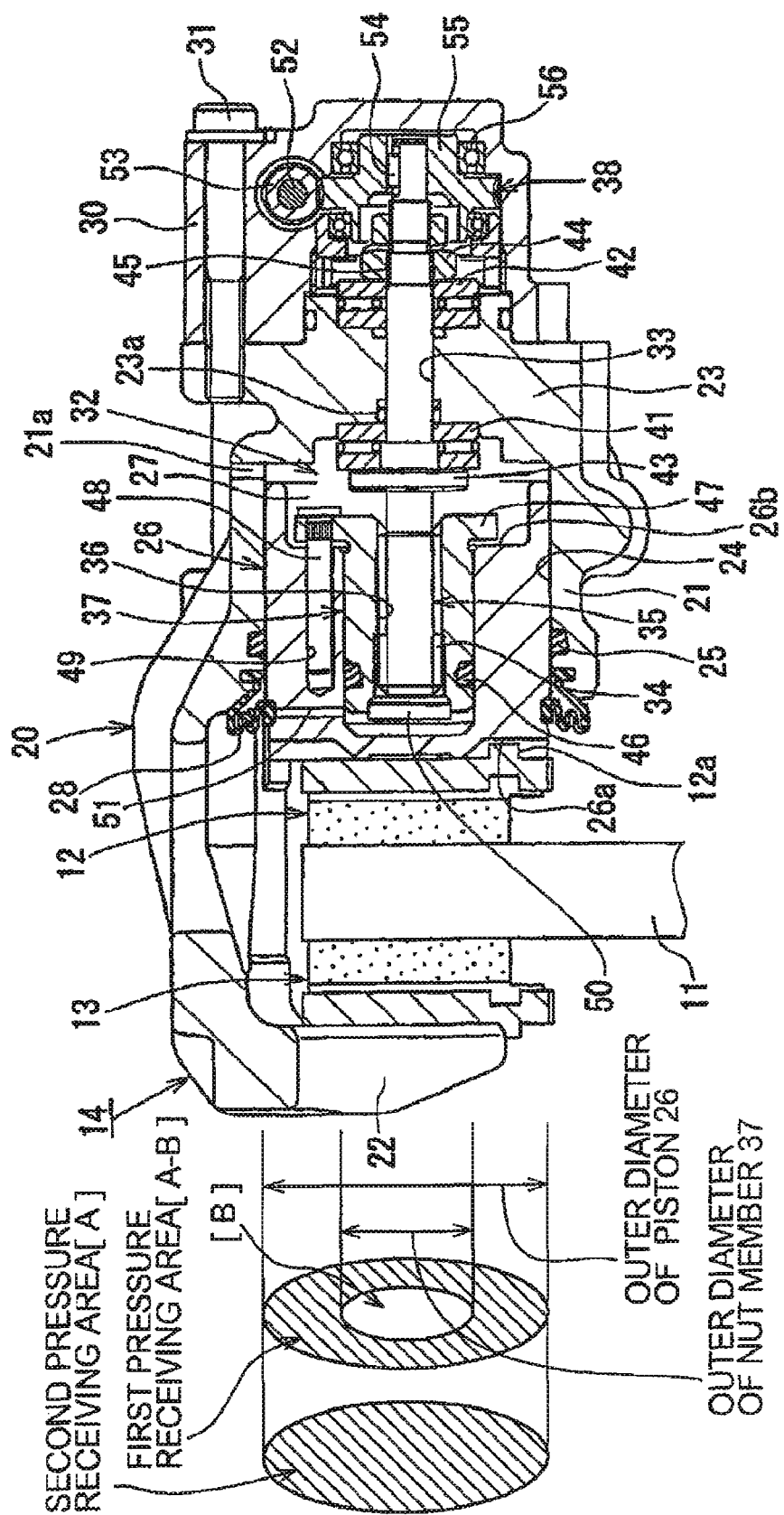
FIG. 2 is a cross-sectional view of the entire structure of the disk brake with the electric parking brake.
Figure 3:
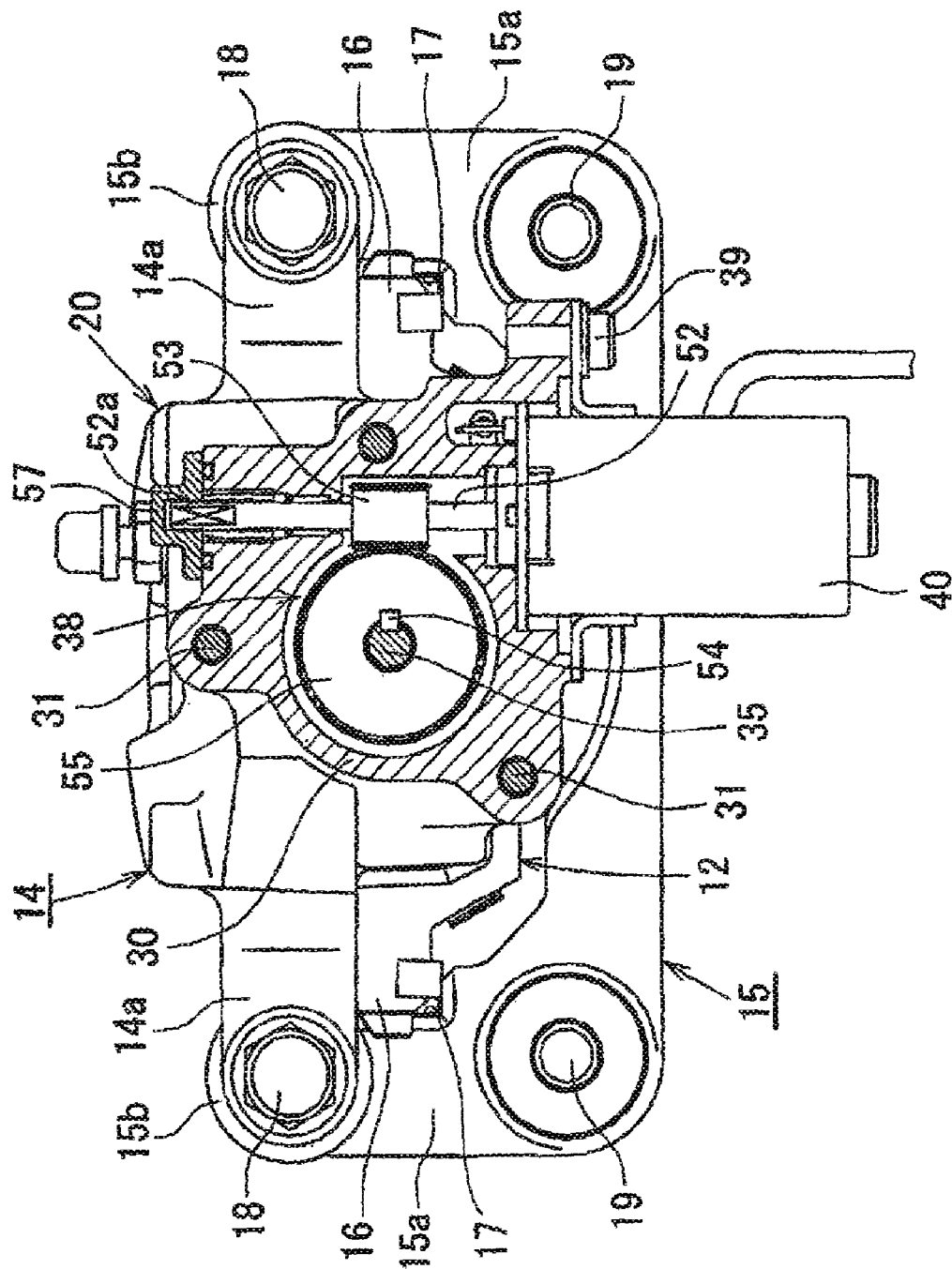
FIG. 3 is a front view, partially in cross section, of the disk brake with the electric parking brake.
Figure 4:
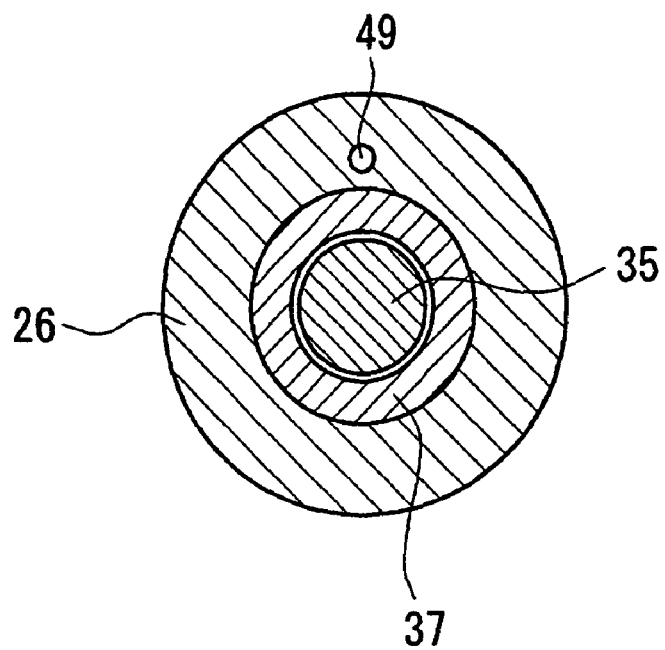
FIG. 4 is a cross-sectional view of an internal structure of a piston, which is a constituent component of the disk brake with the electric parking brake.

As shown in FIGS. 2 to 4, the disk brake 10 with the electric parking brake mechanism comprises a pair of pads 12 and 13 disposed on opposite sides of a disk 11, and a caliper 14 for pressing the pair of pads 12 and 13 against the opposite sides of the disk 11 to exert a braking force. The disk brake 10 with the electric parking brake mechanism is of a caliper-floating type. The pair of pads 12 and 13 and the caliper 14 are supported by a carrier 15, which is fixed by bolts to a non-rotating portion (such as a knuckle) of a vehicle so as to move in an axial direction of the disk 11. More specifically, as clearly shown in FIG. 3, the pads 12 and 13 have left and right ears 16 that are disposed on opposite sides of each of the pads 12 and 13. The ears 16 are fitted into guide grooves 17 that are formed on inner sides of left and right supporting columns 15a of the carrier 15 to face each other. In this way, the pads 12 and 13 are slidably supported by the carrier 15. The caliper 14 has left and right arms 14a to which guide pins (not shown) are attached by means of bolts 18. The guide pins are fitted into guide holes (not shown) in bridge portions 15b of the carrier 15. In this way, the caliper 14 is slidably supported by the carrier 15. It is also to be noted that reference numeral 19 in FIG. 3 denotes screw holes that are formed at left and right sides of the carrier 15. The screw holes are used for bolts to fix the carrier 15 to the non-rotating portion of the vehicle.

A caliper body 20, which is a main body of the caliper 14, has a cylinder portion 21 on a proximal side that faces a pad 12 (inner pad) on an inboard side of the vehicle, and has a claw portion 22 on a distal side that faces a pad 13 (outer pad) on an outboard side of the vehicle. The cylinder portion 21 defines a cylinder 24 having a closed end, that is, one side of the cylinder 24 is open to the inner pad 12, while the other side is closed by a bottom wall 23. A piston 26 (first piston) is slidably fitted via a piston seal 25 into the cylinder 24. In this embodiment, the piston 26 is cup-shaped and is inserted into the cylinder 24 such that a bottom portion of the piston 26 faces the inner pad 12. The piston 26 and the bottom wall 23 (cylinder bottom wall) define a hydraulic pressure chamber 27 therebetween to which a hydraulic pressure is applied by the master cylinder 2 or the pump 4 through a port 21a formed in the cylinder portion 21. The piston 26 has a recess 26a on a bottom surface thereof. The recess 26a is adapted to engage with a projection 12a formed on a rear surface of the inner pad 12, so as to prevent the piston 26 from rotating. Further, the bottom portion of the piston 26 and the caliper body 20 are provided therebetween with a dust boot 28 for preventing foreign substances from entering the cylinder 24.

In this embodiment, a housing 30 is fixed to a rear end of the caliper body 20 by a plurality of bolts 31. The housing 30 and the cylindrical portion 21 of the caliper body 20 are provided therein with a parking brake mechanism 32 that passes through the cylinder bottom wall 23. The parking brake mechanism 32 mainly comprises: a shaft 35 having one end that extends from the cylinder 24 through a through-hole 33 formed in the cylinder bottom wall 23 into the housing 30, and the other end including a male screw 34 provided in a cup of the piston 26; a nut member 37 (second piston, pressing member) having a female screw 36 on an inner surface thereof, the nut member 37 being provided in the cup of the piston 26 to engage the female screw 36 with the male screw 34 of the shaft 35; a deceleration mechanism 38 for rotating the shaft 35, the deceleration mechanism 38 being provided in the housing 30; and an electric motor 40 for driving the deceleration mechanism 38 and being externally fixed to the deceleration mechanism 38 and the housing 30 by a bolt 39 (see FIG. 3). The through-hole 33 of the cylinder bottom wall 23 is provided on an inner surface thereof with a seal member 23a for sealing a space between the inner surface and the shaft 35, whereby the hydraulic pressure chamber 27 in the cylinder 24 is kept liquid tight.

The shaft 35 is positioned along an axis of the cylinder 24 and has an intermediate portion thereof rotatably supported by two bearings (thrust bearings) 41 and 42 that are disposed on opposite sides of the cylinder bottom wall 23. Further, the shaft 35 is provided on the intermediate portion thereof with a flange 43 that is adapted to abut against the bearing 41 in the cylinder 24, and also provided, on an end portion thereof extending into the housing 30, with a threaded portion 45 that is adapted to threadedly engage with a double nut 44. The double nut 44 is screwed onto the threaded portion 45, whereby the shaft 35 is firmly held against the bearings 41 and 42 in the axial direction.

On the other hand, the nut member 37, which is engaged with the shaft 35, is slidably fitted onto an inner surface of the piston 26 via a seal member 46. Further, the nut member 37 has a flange 47 at a rear end thereof. Through the flange 47, a pin 48, which extends in the axial direction, is fitted slidably into a pin hole 49 that is formed in the piston 26 to extend in the axial direction. In this way, the nut member 37 is prevented from rotating relative to the piston 26. The nut member 37 is adapted to linearly move according to rotation of the shaft 35 and bring the flange 47 (contact portion) of the nut member 37 into contact with a rear end 26b (contact portion) of the piston 26 to thereby exert a pressing force against the piston 26 in its thrust direction. It is to be noted that a cover member 50 is provided on an opening of the nut member 37 on a tip side thereof. Further, the piston 26 is provided with an air vent hole 51 that passes through the piston 26 in a radial direction, the air vent hole 51 being adapted to vent air filled in a space between an inner bottom surface of the piston 26 and a tip of the nut member 37 including the cover plate 50. In this embodiment, the pin 48 of the nut member 37 and the pin hole 49 of the piston 26 serve to prevent rotation of the nut member 37 relative to the piston 26. Alternatively, the nut member 37 can be prevented from rotating relative to the caliper body 20.

Figure 5:
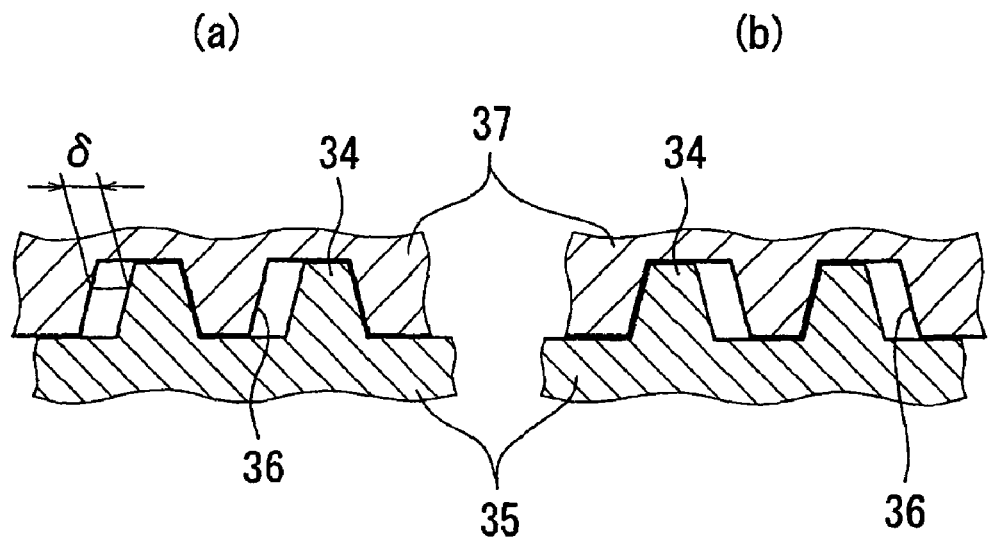
FIG. 5 is a cross-sectional view showing a meshing state of a screw mechanism of the disk brake with the electric parking brake.

The male screw 34 of the shaft 35 and the female screw 36 of the nut member 37 have a trapezoidal shape, as is clearly shown in FIG. 5. The male screw 34 and the female screw 36 are meshed together with a predetermined clearance δ in the axial direction. When a hydraulic pressure acting on the nut member 37 exceeds an axial force (rightward force in FIG. 5) that is exerted by the piston 26 on the nut member 37 by a braking force generated, for example, when a service brake is in operation, a front surface of a thread of the female screw 36 abuts against a rear surface of a thread of the male screw 34, as shown in FIG. 5 (a). On the other hand, when the axial force exceeds the hydraulic pressure, when for example, a parking brake is in operation, a front surface of the thread of the male screw 34 abuts against a rear surface of the thread of the female screw 36, as shown in FIG. 5 (b). The clearance δ is set at a value that is, for example, about 0.8 mm greater than a distance of reverse movement of the piston 26 and the nut member 37 when the brake is released, with the result that the hydraulic pressure no longer acts in the hydraulic pressure chamber 27 of the cylinder 24. The trapezoidal threads are made reversible, such that an axial force, when transmitted to the nut member 37, urges the shaft 35 to rotate. However, the deceleration mechanism 38, which will be described later, is irreversible; thus, a large frictional force is generated in the deceleration mechanism 38, thereby preventing the shaft 35 from rotating even when the electric motor 40 is turned off.

The deceleration mechanism 38 for rotating the shaft 35 comprises: a worm 53 fixed to a rotating shaft 52 of the electric motor 40; and a worm wheel 55 non-rotatably attached via a key 54 to an end of the shaft 35 and meshed with the worm 53. The worm wheel 55 is rotatably supported by the housing 30 via front and rear bearings 56. In this embodiment, the rotating shaft 50 of the electric motor 40 extends across the housing 30 from a bottom side in an upward direction (see FIG. 3). The rotating shaft 52 extends through the housing 30, such that a tip 52a of the rotating shaft 52 projects (upward) from the housing 30. The projecting tip 52a is formed to have two flat surfaces that can be readily gripped by a rotating jig. The projecting tip 52a of the shaft 52 having two flat surfaces is normally covered with a cap 57. It is to be noted that FIG. 2 shows different cross sections along upper and lower portions of a central line of the shaft 35.

Next, operation of the above-described disk brake 10 with the electric parking brake mechanism will be described.

To operate the disk brake 10 with the electric parking brake mechanism as a normal brake or a service brake, the master cylinder 2 applies a hydraulic pressure to the hydraulic pressure chamber 27 in the caliper 14 in response to depression of the brake pedal 1. At this stage, the electric motor 40 is at rest in a rotational position for parking brake release. While the electric motor 40 is at rest, the nut member 37 is prevented from moving in a direction of movement of the piston 26 (see FIG. 5 (a)). Therefore, only the piston 26 is moved to the left in FIG. 2 to press the inner pad 12 against the disk 11. This pressing force is counteracted by a force that moves the caliper body 20 to an inboard side of the vehicle, thereby generating a braking force in accordance with the hydraulic pressure. At this stage, a pressure-receiving area (first pressure-receiving area) of the piston 26 is equal to a value [A−B], i.e., a cross-sectional area A of the entire portion of the piston 26 minus a cross-sectional area B of the nut member 37 (see FIG. 2). Therefore, a generated piston thrust is kept relatively low. That is, even if the brake disk 10 with the electric parking brake mechanism is used as a rear brake, a proper distribution of braking forces can be obtained. It is to be noted that, when the hydraulic pressure is no longer applied to the hydraulic pressure chamber 27, the piston 26 is moved back by an elastic restoring force of the piston seal 25. Accordingly, the pair of pads 12 and 13 is disengaged from the disk 11 to end the braking operation.

In the above operation, the hydraulic pressure on the nut member 37 exerts a force pulling the shaft 35 into the cylinder 24 (to the left in FIG. 2). The movement of the shaft 35 in that direction is limited by the bearing 42 provided in the housing 30, and thus the position of the shaft 35 remains fixed.

To start a parking brake operation, the parking brake switch 9 is turned on, whereby the control apparatus 8 causes the pump 4 to rotate, the electromagnetic switching valve 7 in the branch passage 3a to open, and the electromagnetic switching valve 6 in the branch passage 3b to close. In this way, a hydraulic pressure is applied to the hydraulic pressure chamber 27 by the pump 4. Almost simultaneous with this application of hydraulic pressure, the electric motor 40 is activated in response to a command from the control apparatus 8, to thereby rotate the shaft 35 via the deceleration mechanism 38. In this step, the meshing portions of the threads of the male and female screws 34 and 35 shift from the meshing state shown in FIG. 5 (a) to a separated state. Since a hydraulic pressure is being applied to the nut member 37 at this stage, the nut member 37 is moved forward by the hydraulic pressure so as to close a gap between the meshing portions, until the flange 47 of the nut member 37 is brought into contact with the rear end 26b of the piston 26. Thereafter, the piston 26 and the nut member 37 move together to the left in FIG. 2. In doing so, the shaft 35 is rotated such that the front surface of the thread of the female screw 36 is not at all in contact with or is slightly in contact with the rear surface of the thread of the male screw 34 (to a degree to which the female screw 36 does not press against the male screw 34). In this way, smooth rotation of the shaft 35 is ensured.

In this manner, the piston 26 and the nut member 37 are driven forward to exert a braking force in the same way as is exerted in a normal braking operation. In this step, the pressure receiving area (second pressure receiving area) of the piston 26 including the nut member 37 is equal to the cross-sectional area A of the entire piston 26 (see FIG. 2). As a result, the piston thrust can be enhanced to generate a large brake force. Further, even after the brake force is generated, the motor 40 remains on so as to rotate the shaft 35 until the meshing portions of the male and female screws 34 and 36 reach a meshing state, as shown in FIG. 5 (b). In this meshing state, the electric motor 40 is in a rotational position for parking brake operation.

Subsequently, after the torque of the electric motor 40 reaches a saturation point, the control apparatus 8 causes the electromagnetic switching valve 7 in the branch passage 3a to close, and the electromagnetic valve 6 in the branch valve 3b to open, thereby discharging the hydraulic pressure from the hydraulic pressure chamber 27. Almost at the same time, the electric motor 40 is turned off. Since the meshing portions of the male and female screws 34 and 36 are in the meshing state shown in FIG. 5 (b) at this stage, the axial force from the piston 26 urges the shaft 35 to rotate. However, since the deceleration mechanism 38 is irreversible, the shaft 35 is prevented from rotating. In this way, the nut member 37 remains at the same position. In other words, after the hydraulic pressure is discharged, and the electric motor 40 is turned off, the piston 26 remains at the braking position to perform a parking brake operation. Particularly, in the present embodiment, the deceleration mechanism 38 comprising the worm 53 and the worm wheel 55 is irreversible. Therefore, the shaft 35 can be reliably prevented from rotating, to stably keep the parking brake on. In this operation, a large axial force is applied to the shaft 35 by the piston 26. However, since the bearing 41 in the cylinder 24 prevents the shaft 35 from moving outward of the cylinder 24, the position of the shaft 35 remains fixed. In the above-described embodiment, the deceleration mechanism 38 is made irreversible to keep the parking brake on. However, instead, the male screw 34 of the shaft 35 and the female screw 36 of the nut member 37 can be made irreversible to keep the parking brake on.

To release the parking brake, the parking brake switch 9 is operated, as in the activation of the parking brake, whereby the control apparatus 8 causes the pump 4 to rotate, the electromagnetic switching valve 7 in the branch passage 3a to open, and the electromagnetic switching valve 6 in the branch passage 3b to close. In this way, a hydraulic pressure is applied to the hydraulic pressure chamber 27 by the pump 4. Almost at the same time, the electric motor 40 is activated to rotate in a reverse direction. In this way, the shaft 35 is rotated via the deceleration mechanism 38 to urge the nut member 37 to move backward. However, since an axial force is being applied to the shaft 35 (see FIG. 5 (b)), the shaft 35 cannot be rotated by the torque from the motor 40 until the hydraulic pressure becomes high enough to exert a piston thrust larger than that of the parking brake operation. When the hydraulic pressure becomes high enough to exert a piston thrust larger than that of the parking brake operation, the axial force applied to the nut member 37 by the piston 26 decreases rapidly, thereby causing the shaft 35 to rotate and move the male screw 34 by the clearance δ. As a result, the meshing portions of the male screw 34 and the female screw 36 reach the meshing state shown in FIG. 5 (a). At the same time, when the electromagnetic switching valve 7 in the branch passage 3a and the electromagnetic switching valve 6 in the branch passage 3b are switched to discharge the hydraulic pressure from the hydraulic pressure chamber 27, the piston 26 starts to move backward with the nut member 37 by a predetermined distance of reverse movement of the piston 26 to the initial position. At the same time, the electric motor 40 is turned off to completely terminate the parking brake operation.

As described above, the clearance δ is set to be larger than the distance of reverse movement of the piston 26 and the nut member 37. Therefore, when the piston 26 and the nut member 37 complete the reverse movement, they do not reach the meshing state shown in FIG. 5 (b) where the thread of the female screw 36 of the nut member 37 abuts against the thread of the male screw 34 of the shaft 35 (but stays in a state shown in FIG. 8, which will be described later). Therefore, there is no obstacle to the reverse movement of the piston 26 and the nut member 37.

Figure 6:
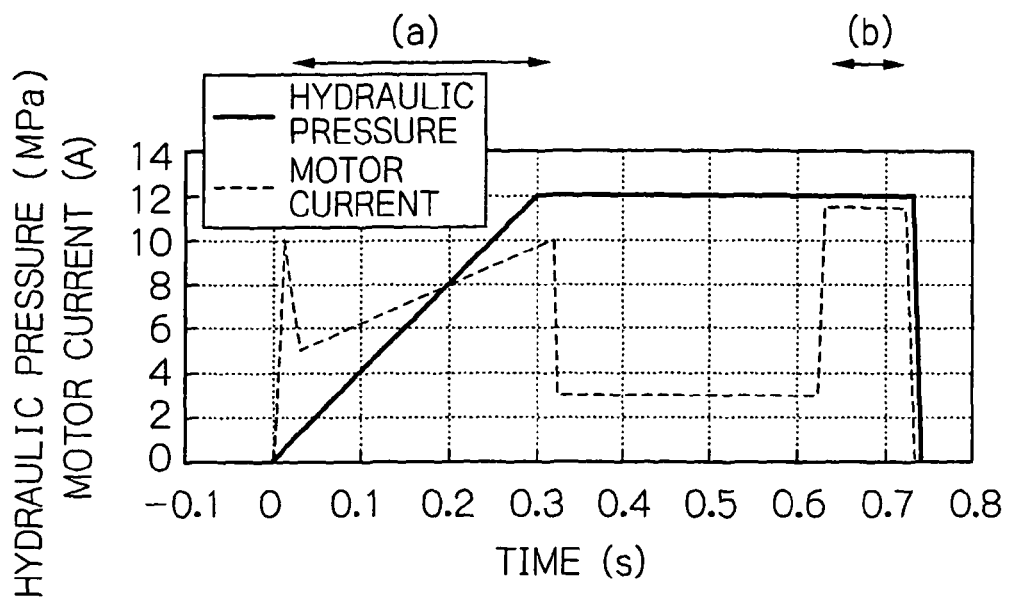
FIG. 6 is a graph showing a relationship between a hydraulic pressure and motor current during a process of engaging the electric parking brake of the present invention.
Figure 7:
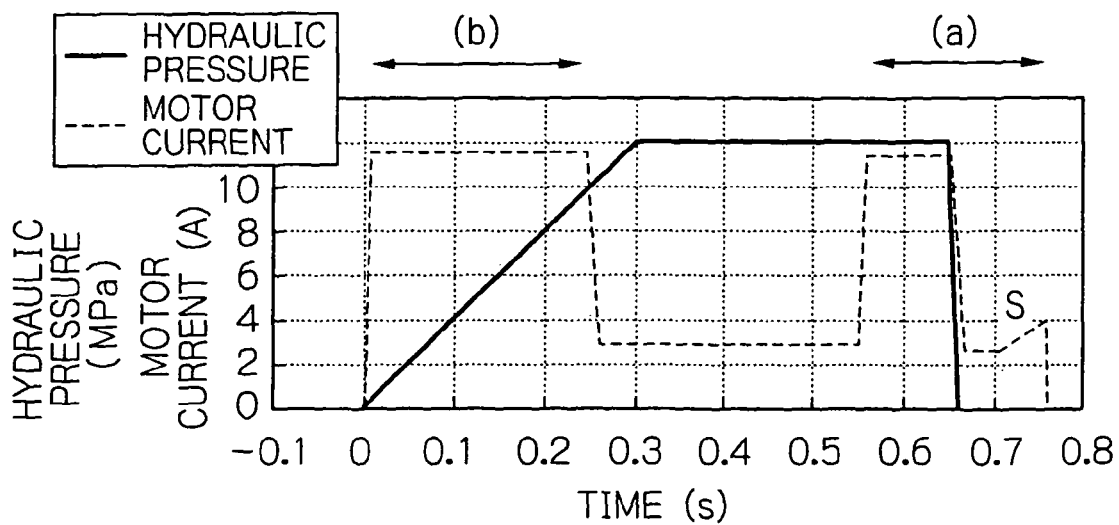
FIG. 7 is a graph showing a relationship between hydraulic pressure and motor current during a process of releasing the electric parking brake of the present invention.

FIG. 6 shows the relationship between the hydraulic pressure and the current (motor current) through the electric motor 40 during a process of engaging a parking brake, and FIG. 7 shows the relationship between the hydraulic pressure and the current through the electric motor 40 during a process of releasing a parking brake. In FIGS. 6 and 7, the sections denoted by (a) and (b) correspond to the meshing states of the screw mechanism shown in FIGS. 5 (a) and (b). In a section between the sections (a) and (b), the threads of the male and female screws 34 and 36 are in a separated state where the meshing portions of the threads of the male and female screws 34 and 36 are separated from each other within the range of the clearance δ. In this state, the motor current is rapidly reduced to a stall current. Therefore, by monitoring the current through the electric motor 40 after the hydraulic pressure has reached a predetermined value, and then stopping the motor 40 and discharging the hydraulic pressure upon reaching the stall current, complete engagement and release of the parking brake can be achieved.

Figure 8:
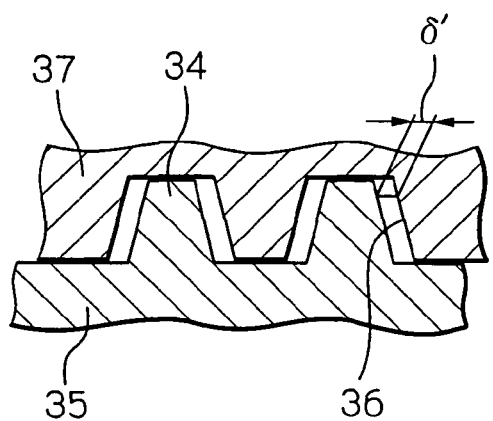
FIG. 8 is a cross-sectional view showing a separated state in which meshing portions of the screw mechanism are separated from each other during a process of releasing the electric parking brake of the present invention.

When the hydraulic pressure is discharged from the hydraulic pressure chamber 27 during a process of releasing the parking brake, as described above, the pads 12 and 13, the cylinder portion 21, the seal members 25 and 46, and so on are elastically restored to their original shapes. This causes the nut member 37 to move together with the piston 26 slightly, to the right in FIG. 2, such that the meshing portions of the male and female screws 34 and 36 are separated from each other by a clearance δ', as shown in FIG. 8. If this separated state were left uncorrected, the nut member 37 would move to the left in FIG. 8 during a service brake operation to bring the flange 47 of the nut member 37 into contact with the rear end of the piston 26, thereby substantially increasing the pressure receiving area of the piston 26 to generate an excessive braking force. Even if the flange 47 were not brought into contact with the rear end 26a of the piston 26, an amount of fluid corresponding to the movement of the nut member 37 would be lost, adversely affecting a brake feeling.

Therefore, in the present embodiment, to eliminate this separated state, an electric current is applied to the electric motor 40 for a predetermined amount of time after the parking brake is released as described above, to rotate the shaft 35, thereby moving the nut member 37 to restore the meshing state shown in FIG. 5(a). In FIG. 7, a latter section S of a wave form (drawn in dotted line) representing the motor current shows this restoring operation. After the nut member 37 is moved by the clearance δ' at a constant current to eliminate the separated state, the current is gradually increased to move the nut member 37 to thereby remove the flange 47 of the nut member 37 from the rear end 26b of the piston 26. The current is increased gradually so that, as the nut member 37 is moved, the seal member 46 is elastically deformed, and, correspondingly, a resistance to the sliding movement of the nut member 37 on the piston 26 increases. At a predetermined time after the parking brake is released, the current to the electric motor 40 is stopped. In this way, separation between the shaft 35 and the nut member 37 can be eliminated, and the above-described problem caused by the separation between the flange 47 of the nut member 37 and the rear end 26a of the piston 26 can also be overcome. It is to be noted that, in the above embodiment, the current is applied to the electric motor 40 before the electric motor 40 completely comes to a halt. However, instead, a current can be reapplied to the electric motor 40 after the electric motor 40 completely comes to a halt.

Figure 9:
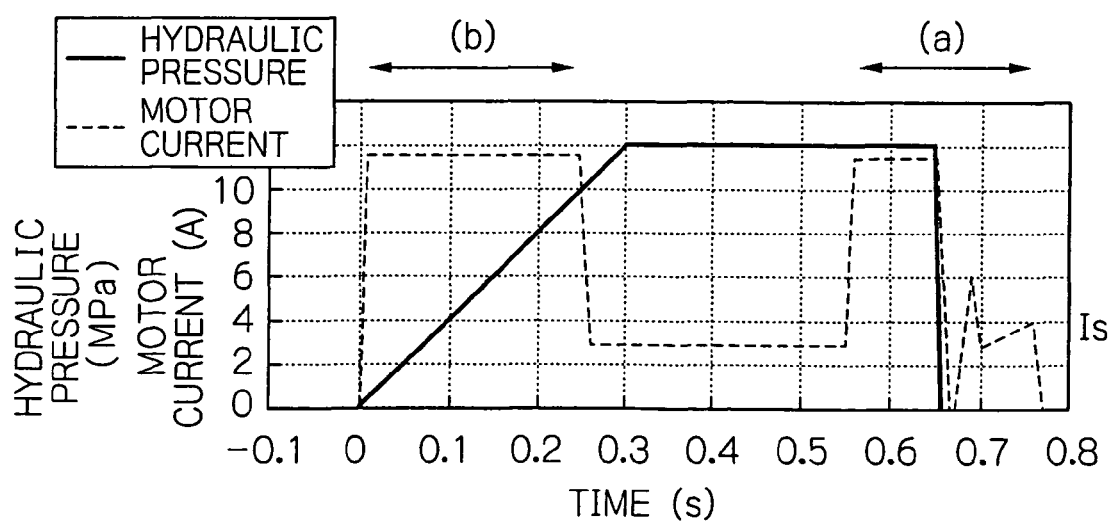
FIG. 9 is a graph showing a relationship between hydraulic pressure and motor current during a process of releasing an electric parking brake according to another embodiment of the present invention.

In another embodiment of the present invention, as shown in FIG. 9, a current can be applied to the electric motor 40 after the parking brake is released as described above, and be stopped when the applied current reaches a predetermined value Is.

As shown in FIG. 9, the current applied to the electric motor 40 is temporarily stopped when the hydraulic pressure in the hydraulic pressure chamber 27 is discharged at a time of release of the braking brake. When the hydraulic pressure chamber 27 is completely free of hydraulic pressure, a current is reapplied to the electric motor 40. In this way, the shaft 35 can be rotated without any resistance, due to the clearance δ' between the shaft 35 and the nut member 37, and the clearance δ' can be eliminated by a rush current at an initial stage of the current application. Once the meshing portions of the male and female screws 34 and 36 reaches the meshing state shown in FIG. 5(a), the current is gradually increased, as shown in FIG. 7, to move the nut member 37 to remove the flange 47 of the nut member 37 from the rear end 26b of the piston 26. When the current to the electric motor 40 reaches a predetermined value Is, the current is stopped. The current Is is determined experimentally at a value where the flange 47 and the rear end 26a of the piston 26 are sufficiently separated from each other, and is stored in a memory of the control apparatus 8. Further, in order to avoid a rush current to be erroneously determined to be the current Is, judgment whether the current to the electric motor 40 has reached the current Is is made after a preset short amount of time corresponding to the period of rush current due to the current reapplication to the electric motor 40, or the current to the electric motor 40 is judged to has truly reached the Is when the Is is detected twice after the current is reapplied to the electric motor 40. In this way, the male and female screws 34 and 36 can be reliably meshed with each other, as shown in FIG. 5(a), which further contributes to reliably preventing the above-described problem.

Should the electric motor 40 malfunction during a parking brake operation, the projecting tip 50a of the rotating shaft that projects out of the housing 30 is engaged with an appropriate rotating jig, after a hydraulic pressure is applied to the hydraulic chamber 27, to forcibly rotate the rotating shaft 50 externally. In this way, the shaft 35 can be rotated by means of the deceleration mechanism 38 to move the nut member 37 backward, thereby releasing the parking brake. Since the rotating shaft 50 is provided on a primary side of the deceleration mechanism 38, a smaller amount of force is required to release the parking brake than would be necessary when manually rotating the shaft 35 provided on a secondary side of the deceleration mechanism 38. Simply put, manual release of the parking brake can be readily completed.

What is claimed is:

1. A disk brake with a parking brake mechanism comprising:
   a pair of pads disposed on opposite sides of a disk;
   a caliper in which a piston is slidably provided in a cylinder, such that a hydraulic pressure, when introduced into the cylinder, thrusts the piston to cause the pair of pads to press against the disk, thereby exerting a braking force; and
   a parking brake mechanism driven by an electric motor when the hydraulic pressure is introduced into the cylinder to press the pads against the disk, and adapted to mechanically hold the piston in a braking position even after the hydraulic pressure is no longer applied to the cylinder,
   wherein, when the electric motor is in a rotational position for parking brake release, the piston uses a first pressure receiving area to receive a hydraulic pressure applied to the cylinder and presses the pads, and when the electric motor is in a rotational position for parking brake operation, the piston uses a second pressure receiving area to receive the hydraulic pressure applied to the cylinder and presses the pads, the second pressure receiving area being larger than the first pressure receiving area.

2. A disk brake with a parking brake mechanism according to claim 1,
   wherein the piston comprises
      a first piston having the first pressure receiving area; and
      a second piston having a pressure receiving area, which is equal to a difference between the first pressure receiving area and the second pressure receiving area.

3. A disk brake with a parking brake mechanism according to claim 2, wherein the first piston and the second piston have contact portions that can be brought into contact with each other according to a relative movement of the first piston and the second piston, such that, while a hydraulic pressure is applied to the cylinder, the contact portions are separated from each other when the electric motor is in a rotational position for parking brake release, and the contact portions are in contact with each other when the electric motor is in a rotational position for parking brake operation.

4. A disk brake with a parking brake mechanism comprising:
a pair of pads disposed on opposite sides of a disk;
a caliper in which a cup-shaped piston is slidably provided in a cylinder having a closed end, such that a hydraulic pressure, when introduced into the cylinder by a hydraulic pressure source, thrusts the piston to cause the pair of pads to press against the disk, thereby exerting a braking force; and
a parking brake mechanism driven by an electric motor that is provided outside the cylinder, and adapted to mechanically hold the piston, which has been thrust by the hydraulic pressure applied to the cylinder, in a braking position even after the hydraulic pressure is no longer applied to the cylinder,
wherein the parking brake mechanism comprises:
a pressing member adapted to slide in the piston according to rotation of the electric motor and press the piston in a thrust direction; and
a seal member for sealing a space between the pressing member and the piston, such that movement of the pressing member in a direction of movement of the piston is limited when the electric motor is in a rotational position for parking brake release, and a hydraulic pressure is applied to the cylinder.

5. A disk brake with a parking brake mechanism according to claim 4, wherein the pressing member is adapted to make contact with the piston in a direction of movement of the pressing member, such that, when the electric motor is in a rotational position for parking brake release, the pressing member and the piston are separated from each other, and when the electric motor is in a rotational position for parking brake operation, the pressing member and the piston are in contact with each other.

6. A disk brake with a parking brake mechanism according to claim 5, wherein the pressing member has a flange at an end portion thereof, the flange being adapted to make contact with an end surface of the piston.

7. A disk brake with a parking brake mechanism according to claim 6, wherein the pressing member is prevented from rotating relative to the piston by slidably inserting a pin, which is disposed on the flange, into a pin hole formed in the piston.

8. A disk brake with a parking brake mechanism according to claim 4, wherein the pressing member comprises a nut member that is provided on an inner side thereof with a female screw and that is prevented from rotating relative to the piston, and wherein the parking brake mechanism is adapted to drive the nut member by means of a shaft that extends through a cylinder bottom wall into the cylinder and that is screwed into the nut member.

9. A disk brake with a parking brake mechanism according to claim 8, wherein, during a process of releasing a parking brake, the electric motor is rotated simultaneously with or subsequently to an application of hydraulic pressure to the cylinder until the hydraulic pressure in the cylinder reaches a predetermined value; thereafter, when a current to the electric motor reaches a stall current, the hydraulic pressure is discharged from the cylinder.

10. A disk brake with a parking brake mechanism according to claim 9, wherein the electric motor is rotated for a predetermined amount of time after the hydraulic pressure is discharged from the cylinder during the process of releasing the parking brake.

11. A disk brake with a parking brake mechanism according to claim 9, wherein, during the process of releasing the parking brake, the electric motor is turned on after a discharge of the hydraulic pressure from the cylinder is completed, and is turned off when the current to the electric motor reaches a predetermined value.

12. A disk brake with a parking brake mechanism according to claim 8, wherein the electric motor has a drive shaft that can be rotated from outside the caliper.

13. A disk brake with a parking brake mechanism according to claim 9, wherein a clearance extending in an axial direction is formed between the threads of the nut member and the shaft that are engaged with each other, the clearance being set to be larger than a distance of reverse movement of the nut member when a hydraulic pressure is discharged from the cylinder.

14. A disk brake with a parking brake mechanism according to claim 8, wherein the shaft is rotatably supported by two bearings disposed on opposite sides of the cylinder bottom wall, such that the shaft cannot be moved in an axial direction.

15. A disk brake with a parking brake mechanism according to claim 4, wherein the pressing member is prevented from rotating relative to the piston.

* * * * *